United States Patent
Wang et al.

(10) Patent No.: US 12,261,698 B2
(45) Date of Patent: Mar. 25, 2025

(54) TIMER HANDLING IN MULTIPLE ACTIVE GRANT CONFIGURATIONS

(71) Applicant: TELEFONAKTIEBOLAGET LM ERICSSON (PUBL), Stockholm (SE)

(72) Inventors: Min Wang, Luleå (SE); Reem Karaki, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 17/774,921

(22) PCT Filed: Nov. 6, 2020

(86) PCT No.: PCT/IB2020/060491
§ 371 (c)(1),
(2) Date: May 6, 2022

(87) PCT Pub. No.: WO2021/090278
PCT Pub. Date: May 14, 2021

(65) Prior Publication Data
US 2022/0393794 A1    Dec. 8, 2022

Related U.S. Application Data

(60) Provisional application No. 62/932,242, filed on Nov. 7, 2019.

(51) Int. Cl.
*H04L 1/08*    (2006.01)
*H04W 72/23*   (2023.01)

(52) U.S. Cl.
CPC .............. *H04L 1/08* (2013.01); *H04W 72/23* (2023.01)

(58) Field of Classification Search
CPC ........ H04L 1/08; H04L 1/1887; H04L 1/1893; H04L 1/188; H04W 72/23
See application file for complete search history.

(56) References Cited

U.S. PATENT DOCUMENTS

| 2018/0160445 A1 | 6/2018 | Babaei |
| 2019/0132862 A1 | 5/2019 | Jeon et al. |
| 2019/0261354 A1 | 8/2019 | Akbar |
| 2020/0351031 A1* | 11/2020 | Wu .................. H04L 1/1883 |

(Continued)

FOREIGN PATENT DOCUMENTS

| CN | 101217351 A | 7/2008 |
| CN | 110089060 B | 6/2022 |

OTHER PUBLICATIONS

MediaTek Inc., "Configured grant retransmission timer", May 13-17, 2019, 3GPP, R2-1907056 (Year: 2019).*

(Continued)

*Primary Examiner* — Peter P Chau
(74) *Attorney, Agent, or Firm* — Ericsson Inc.

(57) ABSTRACT

Systems and methods for determining retransmission configuration(s) are provided herein. Some embodiments relate to configuring one or more timers associated with configured grant configurations. A network node can configure a wireless device with a plurality of different configured grant configurations and associated parameters. The wireless device can use a first configured grant configuration for transmitting data and a second configured grant configuration for retransmitting the data.

26 Claims, 9 Drawing Sheets

(56) References Cited

U.S. PATENT DOCUMENTS

2022/0109545 A1* 4/2022 Kuo ............... H04L 5/0098
2022/0116988 A1* 4/2022 Shi ............... H04L 1/1887

OTHER PUBLICATIONS

3GPP, "3rd Generation Partnership Project; Technical Specification Group Radio Access Network; Study on NR-based access to unlicensed spectrum (Release 16)", 3GPP TR 38.889 V16.0.0, Dec. 2018, 1-119.

Ericsson, Controlling AUL retransmissions with configured grants, 3GPP TSG-RAN WG2 #107, Tdoc R2-1910790, Prague, Czech Republic, Aug. 26-30, 2019.

Ericsson, Discussions on configured grant in NR-U, 3GPP TSG-RAN WG2 #107bis, R2-1913501, Chongqing, China, Oct. 14-18, 2019.

InterDigital, Configured grant transmission in NR-U, 3GPP RAN WG2 Meeting #106, R2-1906404, Reno, USA, May 13-17, 2019.

LG Electronics Inc., LG UPLUS, Discussion on de-prioritized MAC PDU on CG resource, 3GPP TSG-RAN WG2 Meeting #107bis, R2-1913848 (Revision of 1910976), Chongqing, China, Oct. 14-18, 2019.

Mediatek Inc., Impact of BWP switch on SPS and configured grants, 3GPP TSG-RAN WG2 #101bis, R2-1805099, Sanya, China, Apr. 16-20, 2018.

IPRP dated Apr. 19, 2022 from corresponding PCT application PCT/IB2020/060491.

LG Electronics Inc., Discussion on de-prioritized MAC PDU on CG resource, 3GPP TSG-RAN WG2 Meeting #107, R2-1910976, Prague, Czech Republic, Aug. 26-30, 2019.

Nokia et al., Multiple configured grants per BWP for NR-U, 3GPP TSG-RAN WG2 Meeting #107, R2-1910092, Prague, Czech Republic, Aug. 26-30, 2019.

Nokia et al., On Autonomous Transmission of Pending MAC PDUs, 3GPP TSG-RAN WG2 Meeting #108, R2-1915490, Reno, NV, USA, Nov. 18-22, 2019.

Qualcomm Inc, Remaining Aspects of Configured Grant Transmission for NR-U, 3GPP TSG RAN WG2 Meeting #106, R2-1906414, Reno, USA, May 13-17, 2019.

* cited by examiner

TIMER HANDLING IN MULTIPLE ACTIVE GRANT CONFIGURATIONS

CROSS REFERENCE TO RELATED APPLICATIONS

This application claims the benefit of U.S. Provisional Application No. 62/932,242 filed on Nov. 7, 2019, the entire contents of which are hereby incorporated by reference.

TECHNICAL FIELD

The present disclosure generally relates to wireless communications and wireless communication networks.

INTRODUCTION

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. The later includes deployment at both low frequencies (e.g. 100s of MHz), similar to LTE today, and very high frequencies (e.g. mm waves in the tens of GHz). Besides the typical mobile broadband use case, NR is being developed to also support machine type communication (MTC), ultra-low latency critical communications (URLCC), side-link device-to-device (D2D) and other use cases.

Similar to LTE, NR uses OFDM (Orthogonal Frequency Division Multiplexing) in the downlink (i.e. from a network node, gNB, eNB, or base station, to a user equipment or UE). In the uplink (i.e. from UE to gNB), both DFT-spread OFDM and OFDM can be supported.

In NR, the basic scheduling unit is called a slot. A slot consists of 14 OFDM symbols for the normal cyclic prefix configuration. NR supports many different subcarrier spacing configurations and at a subcarrier spacing of 30 kHz the OFDM symbol duration is ~33 µs. As an example, a slot with 14 symbols for the same subcarrier-spacing (SCS) is 500 µs long (including cyclic prefixes).

The basic NR physical resource over an antenna port can thus be seen as a time-frequency grid as illustrated in FIG. 1, where a resource block (RB) in a 14-symbol slot is shown. A resource block corresponds to 12 contiguous subcarriers in the frequency domain. Resource blocks are numbered in the frequency domain, starting at 0 from one end of the system bandwidth. Each resource element corresponds to one OFDM subcarrier during one OFDM symbol interval.

NR also supports flexible bandwidth configurations for different UEs on the same serving cell. In other words, the bandwidth monitored by a UE and used for its control and data channels may be smaller than the carrier bandwidth. One or multiple bandwidth part (BWP) configurations for each component carrier can be semi-statically signaled to a UE, where a bandwidth part consists of a group of contiguous PRBs. Reserved resources can be configured within the bandwidth part. The bandwidth of a bandwidth part equals to or is smaller than the maximal bandwidth capability supported by a UE.

NR is targeting access to both licensed and unlicensed bands. Allowing unlicensed networks, i.e., networks that operate in shared spectrum (or unlicensed spectrum) to effectively use the available spectrum can be an attractive approach to increase system capacity. Although unlicensed spectrum does not match the qualities of the licensed regime, solutions that allow an efficient use of it as a complement to licensed deployments have the potential to bring value to the 3GPP operators, and, ultimately, to the 3GPP industry as a whole. It is expected that some features in NR will need to be adapted to comply with the special characteristics of the unlicensed band as well as also different regulations. A subcarrier spacing of 15 or 30 kHz are the most promising candidates for NR unlicensed spectrum (NR-U) OFDM numerologies for frequencies below 6 GHz.

When operating in unlicensed spectrum, many regions in the world require a device to sense the medium as free before transmitting. This operation is often referred to as listen-before-talk (LBT). There are many variations of LBT depending on which radio technology the device uses and which type of data it wants to transmit at the moment. Common for all variations is that the sensing is done in a particular channel (e.g. corresponding to a defined carrier frequency) and over a predefined bandwidth. For example, in the 5 GHz band, the sensing is done over 20 MHz channels.

Many devices are capable of transmitting (and receiving) over a wide bandwidth including multiple sub-bands/channels, e.g., LBT sub-band (i.e., the frequency part with bandwidth equals to LBT bandwidth). A device is only allowed to transmit on the sub-bands where the medium is sensed as free. Again, there are different flavors of how the sensing should be done when multiple sub-bands are involved.

In principle, there are two ways a device can operate over multiple sub-bands. One way is that the transmitter/receiver bandwidth is changed depending on which sub-bands that are sensed as free. In this setup, there is only one component carrier (CC) and the multiple sub-bands are treated as single channel with a larger bandwidth. Another way is that the device operates almost independent processing chains for each channel. Depending on how independent the processing chains are, this option can be referred to as either carrier aggregation (CA) or dual connectivity (DC).

Listen-before-talk (LBT) is designed for unlicensed spectrum co-existence with other RATs. In the conventional mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before the next CCA attempt. In order to protect the ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For QoS differentiation, a channel access priority based on the service type has been defined. For example, there are four LBT priority classes are defined for differentiation of contention window sizes (CWS) and MCOT between services.

In NR-U, both configured scheduling and dynamic scheduling can be used.

Configured Scheduling

In NR, configured scheduling is used to allocate semi-static periodic assignments or grants for a UE. For uplink, there are two types of configured scheduling schemes: Type 1 and Type 2. For Type 1, configured grants are configured via RRC signaling only. For Type 2, similar configuration procedure as SPS UL in LTE was defined, i.e. some parameters are preconfigured via RRC signaling and some physical layer parameters are configured via MAC scheduling procedure. The detailed procedures are explained in 3GPP TS 38.321 V15.4.0. The configured uplink scheduling can also be used in NR unlicensed operation. For NR-U, the configured scheduling can improve the channel access probability for PUSCH transmission due to additional LBT for PDCCH transmission per UL grant is avoided and the UE can acquire channel for PUSCH transmission using a configured grant after LBT success. In this uplink transmission procedure, only single LBT procedure is needed as compared to three LBT procedures (e.g. one for SR TX, one for PDCCH for UL grant, and one for PUSCH TX) relying on the SR/BSR procedure. This can significantly improve the channel access probability for PUSCH transmission.

As described in 3GPP TR 38.889, for both Type 1 and Type 2, only the initial Hybrid Automatic Repeat Request (HARQ) transmission is allowed to use configured grant. A HARQ retransmission relies on dynamic grant which is indicated via PDCCH addressed to CS-RNTI.

In NR Rel-15, it is desirable to introduce feLAA Autonomous Uplink Transmission (AUL) type behavior. However, it is important to recognize that the baseline is Type1 and Type2 configured grants (CG). Some enhancements may be needed over and above this baseline to enable the desired behavior. Similar to SPS in LTE, the CG periodicity is RRC configured and is specified in the ConfiguredGrantConfig IE. Different periodicity values are supported in NR Rel-15 depending on the subcarrier spacing. For example, for 15 and 30 kHz SCS, the following periodicities are supported, expressed in a number of OFDM symbols:

15 kHz SCS
   2, 7, and n*14 OFDM symbols
     where n∈{1, 2, 4, 5, 8, 10, 16, 20, 32, 40, 64, 80, 128, 160, 320, 640}

30 kHz SCS
   2, 7, and n*14 OFDM symbols
     where n∈{1, 2, 4, 5, 8, 10, 16, 20, 32, 40, 64, 80, 128, 160, 256, 320, 640, 1280}

For Type1 configured grants, in addition to the periodicity, the time domain allocation of PUSCH is configured purely via RRC signaling:

timeDomainOffset: Provides a slot offset with respect to SFN 0 timeDomainAllocation: Provides an index into a table of 16 possible combinations of PUSCH mapping type (TypeA or TypeB), start symbol S for the mapping (S=OFDM symbol 0, 2, 4, or 8 within a slot), and length L of the mapping (L=4, 6, 8, 10, 12, or 14 OFDM symbols).

For the case of Type2 configured grants, the periodicity is configured by RRC in the same way as for Type1, but the slot offset is dynamically indicated and is given by the slot in which the UE receives the DCI that activates the Type2 configured grant. In contrast to Type1, the time domain allocation of PUSCH is indicated dynamically by DCI via the time domain resource assignment field in the same way as for scheduled (non-CG) PUSCH. This DCI field indexes a table of start symbol and length (SLIV) values. The detailed configuration details of the RRC specification (see for example 3GPP TS 38.331 v 15.6.0) for configured grant is illustrated as below.

ConfiguredGrantConfig Information Element (IE):

```
ConfiguredGrantConfig : :=      SEQUENCE {
    frequencyHopping             ENUMERATED {intraSlot, interSlot}
    OPTIONAL,   -- Need S,
    cg-DMRS-Configuration        DMRS-UplinkConfig,
    mcs-Table                    ENUMERATED {qam256, qam64LowSE}
    OPTIONAL,   -- Need S
    mcs-TableTransformPrecoder   ENUMERATED {qam256, qam64LowSE}
    OPTIONAL,   -- Need S
    uci-OnPUSCH                  SetupRelease { CG-UCI-OnPUSCH }
    OPTIONAL,   -- Need M
    resourceAllocation           ENUMERATED { resourceAllocationType0,
resourceAllocationType1, dynamicswitch } ,
    rbg-Size                     ENUMERATED {config2}
    OPTIONAL,   -- Need S
    powerControlLoopToUse        ENUMERATED {n0, n1} ,
    p0-PUSCH-Alpha               P0-PUSCH-AlphaSetId,
    transformPrecoder            ENUMERATED {enabled, disabled}
    OPTIONAL,   -- Need S
    nrofHARQ-Processes           INTEGER(1. .16) ,
    repK                         ENUMERATED {n1, n2, n4, n8} ,
    repK-RV                      ENUMERATED {s1-0231, s2-0303, s3-0000}
    OPTIONAL,   -- Need R
    periodicity                  ENUMERATED {
                                    sym2, sym7, sym1x14, sym2x14,
sym4x14, sym5x14, sym8x14, sym10x14, sym16x14, sym20x14,
                                    sym32x14, sym40x14, sym64x14,
sym80x14, sym128x14, sym160x14, sym256x14, sym320x14, sym512x14,
                                    sym640x14, sym1024x14,
sym1280x14, sym2560x14, sym5120x14,
                                    sym6, sym1x12, sym2x12,
sym4x12, sym5x12, sym8x12, sym10x12, sym16x12, sym20x12, sym32x12,
                                    sym40x12, sym64x12, sym80x12,
sym128x12, sym160x12, sym256x12, sym320x12, sym512x12, sym640x12,
                                    sym1280x12, sym2560x12
    },
    configuredGrantTimer         INTEGER (1. .64)
    OPTIONAL,   -- Need R
    rrc-ConfiguredUplinkGrant    SEQUENCE {
        timeDomainOffset             INTEGER (0. .5119) ,
        timeDomainAllocation         INTEGER (0. .15) ,
```

-continued

```
    frequencyDomainAllocation      BIT STRING (SIZE (18) ),
    antennaPort                    INTEGER (0. .31) ,
    dmrs-SeqInitialization         INTEGER (0. .1)
OPTIONAL, -- Need R
    precodingAndNumberOfLay-       INTEGER (0. .63) ,
ers
    srs-ResourceIndicator          INTEGER (0. .15)
OPTIONAL, -- Need R
    mcsAndTBS                      INTEGER (0. .31) ,
    frequencyHoppingOffset         INTEGER (1. .
maxNrofPhysicalResourceBlocks-1)   OPTIONAL, -- Need R
    PathlossReferenceIndex         INTEGER (0. .maxNrofPUSCH-
PathlossReferenceRSs-1) ,
    ...
    }
 OPTIONAL,  -- Need R
    ... ,
}
```

Autonomous Uplink Transmission (AUL) mechanisms are currently designed based on the configured scheduling scheme to support autonomous retransmission using a configured grant. To support autonomous retransmission in uplink using a configured grant, the configuration of the associated re-transmission timer(s) and HARQ process(es) need to be determined.

SUMMARY

It is an object of the present disclosure to obviate or mitigate at least one disadvantage of the prior art.

There are provided systems and methods for determining retransmission configuration(s).

In a first aspect there is provided a method performed by a wireless device. The wireless device comprises a radio interface and processing circuitry and can be configured to obtain configuration information including a plurality of configured granted (CG) configurations. The wireless device selects data from a logical channel mapped to a first CG configuration for transmission, and transmits the selected data using the first CG configuration. Responsive to determining that a retransmission of the data is required, the wireless device selects a second CG configuration to use for the retransmission, the second CG configuration being different than the first CG configuration. The wireless device retransmits the data using the selected second CG configuration.

In some embodiments, the configuration information is received from a network node.

In some embodiments, the logical channel can be mapped to one or more of the plurality of CG configurations. One or more of the plurality of CG configurations can share a same Hybrid Automatic Repeat Request (HARQ) process.

In some embodiments, in response to transmitting the selected data, the wireless device can start one or more timers. A CG timer can be started in accordance with the first CG configuration, the CG timer defining a maximum time period during which the wireless device can trigger autonomous retransmission. A retransmission timer can be started in accordance with the first CG configuration, the retransmission timer defining a time period after which the wireless device triggers a next retransmission attempt.

In some embodiments, the retransmission timer can be stopped in response to one of: receiving HARQ feedback indicating an acknowledgement (ACK) or negative acknowledgment (NACK); or receiving a grant indicating a new transmission or retransmission for the transmitted data.

In some embodiments, determining that the retransmission is required is in response to an expiration of a retransmission timer.

In some embodiments, the second CG configuration can be selected in accordance with selecting an earliest time resource belonging to any of the plurality of CG configurations.

In some embodiments, the second CG configuration can be selected in accordance with the first and second CG configurations sharing a same HARQ process.

In some embodiments, the second CG configuration can be selected in accordance with the second CG configuration providing a same transport block size as the transmitted data.

In some embodiments, the logical channel is not mapped to the selected second CG configuration.

In some embodiments, in response to retransmitting the data, the retransmission timer is restarted in accordance with the second CG configuration. In some embodiments, in response to retransmitting the data, the CG timer is not updated.

In another aspect there is provided a method performed by a network node. The network node comprises a radio interface and processing circuitry and can be configured to generate configuration information including a plurality of configured granted (CG) configurations. The network node transmits a control message including the configuration information to one or more wireless device(s). The network node receives a data retransmission from the wireless device, wherein a first CG configuration was used for an initial data transmission and a second CG configuration was used for the retransmission.

In some embodiments, the first and second CG configurations share a same Hybrid Automatic Repeat Request (HARQ) process.

In some embodiments, each of the plurality of CG configurations includes corresponding retransmission timer information.

In some embodiments, the second CG configuration can be selected in accordance with selecting an earliest time resource belonging to any of the plurality of CG configurations.

In some embodiments, the second CG configuration can be selected in accordance with the first and second CG configurations sharing a same HARQ process.

In some embodiments, wherein the second CG configuration can be selected in accordance with the second CG configuration providing a same transport block size as the transmitted data.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
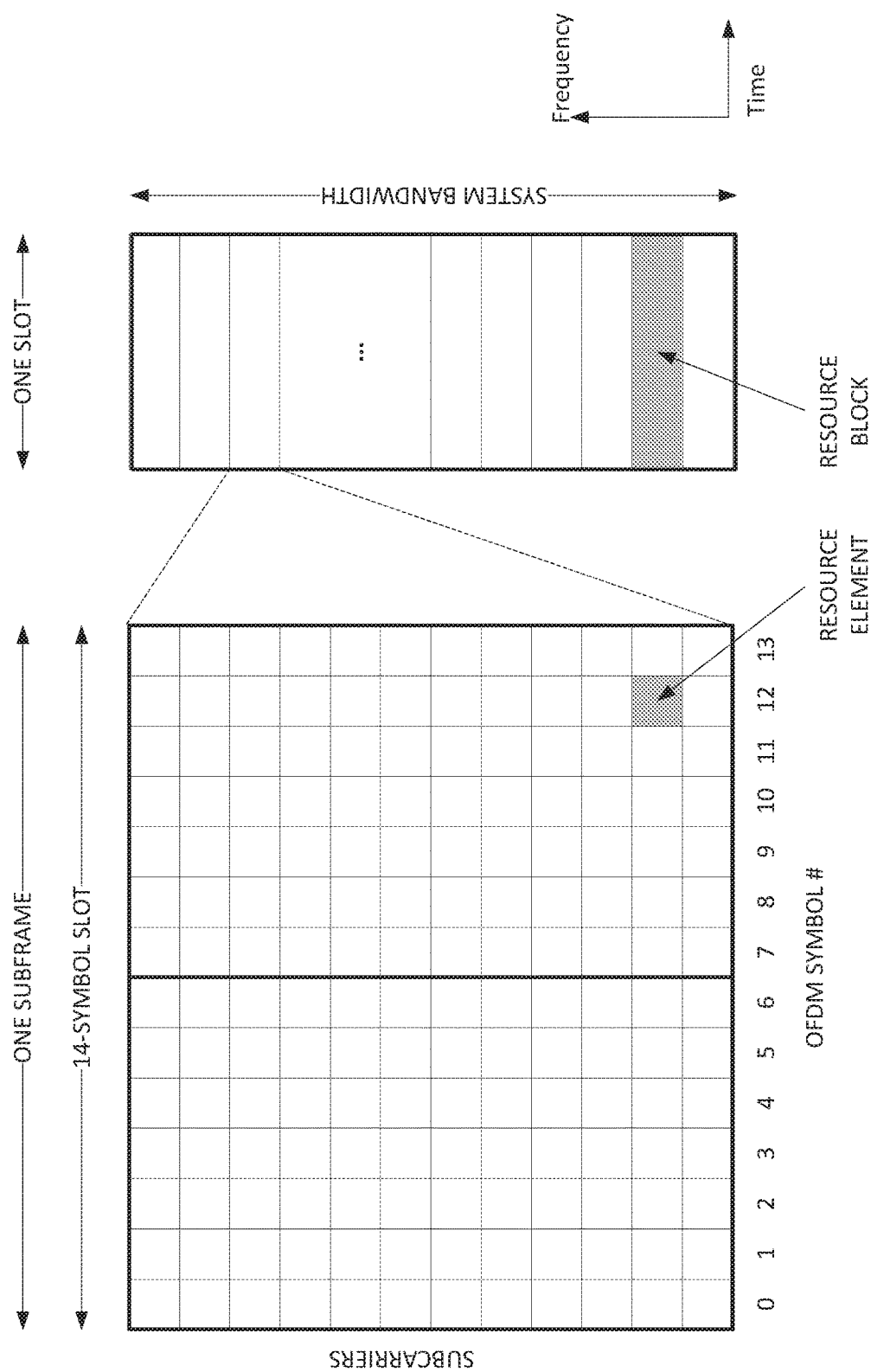
FIG. 1 illustrates an example of NR physical resources.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail herein with respect to FIG. 7.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 9.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit main data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re)selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G NR concepts, beams may be used instead of cells and, as such, it is important to note that the concepts described herein are equally applicable to both cells and beams.

Figure 2:
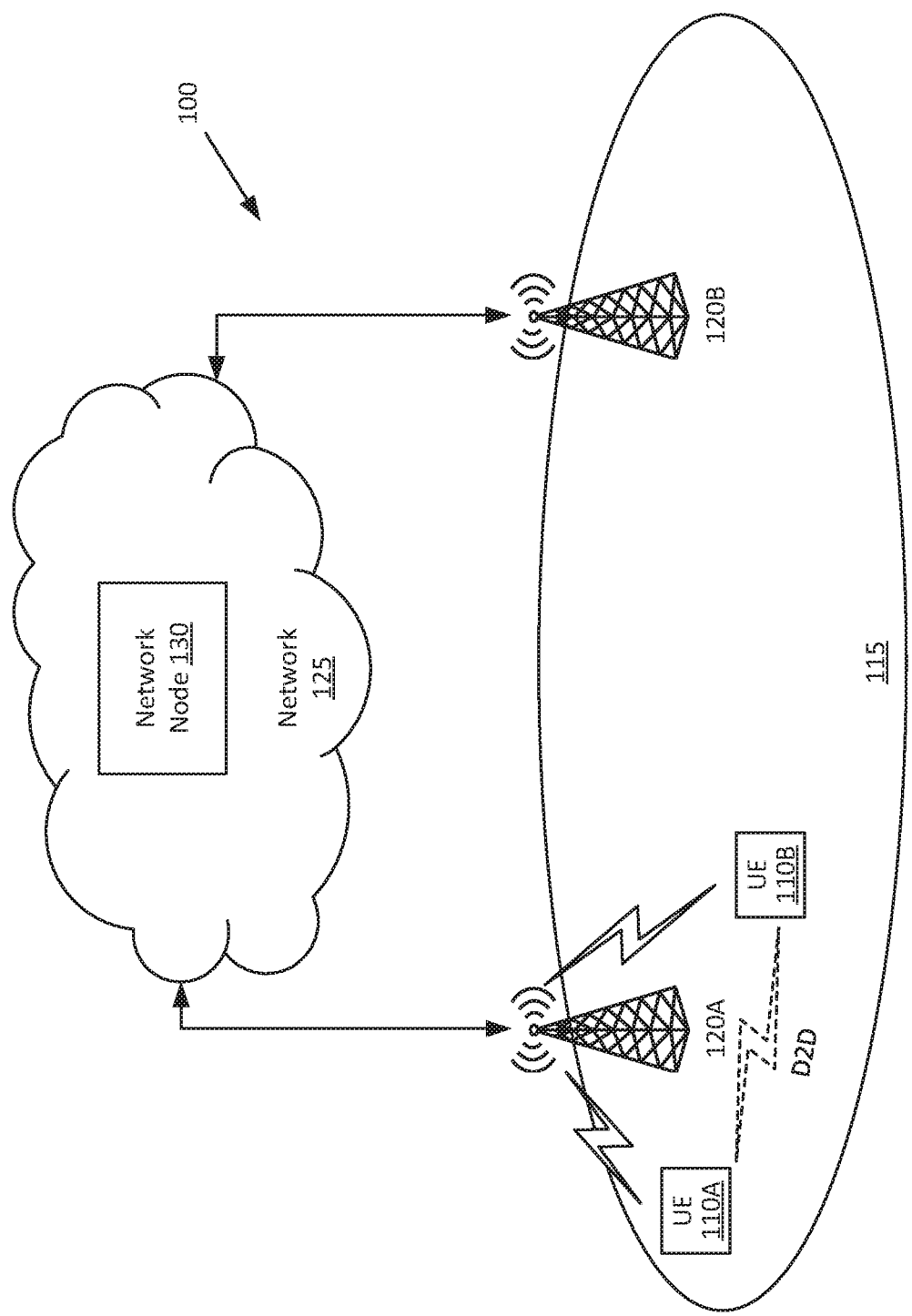
FIG. 2 illustrates an example wireless network.

FIG. 2 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

In some embodiments, radio access node 120 can be a "distributed" radio access node in the sense that the radio access node 120 components, and their associated functions, can be separated into two main units (or sub-radio network nodes) which can be referred to as the central unit (CU) and the distributed unit (DU). Different distributed radio network node architectures are possible. For instance, in some architectures, a DU can be connected to a CU via dedicated wired or wireless link (e.g., an optical fiber cable) while in other architectures, a DU can be connected a CU via a transport network. Also, how the various functions of the radio access node 120 are separated between the CU(s) and DU(s) may vary depending on the chosen architecture.

Figure 3:
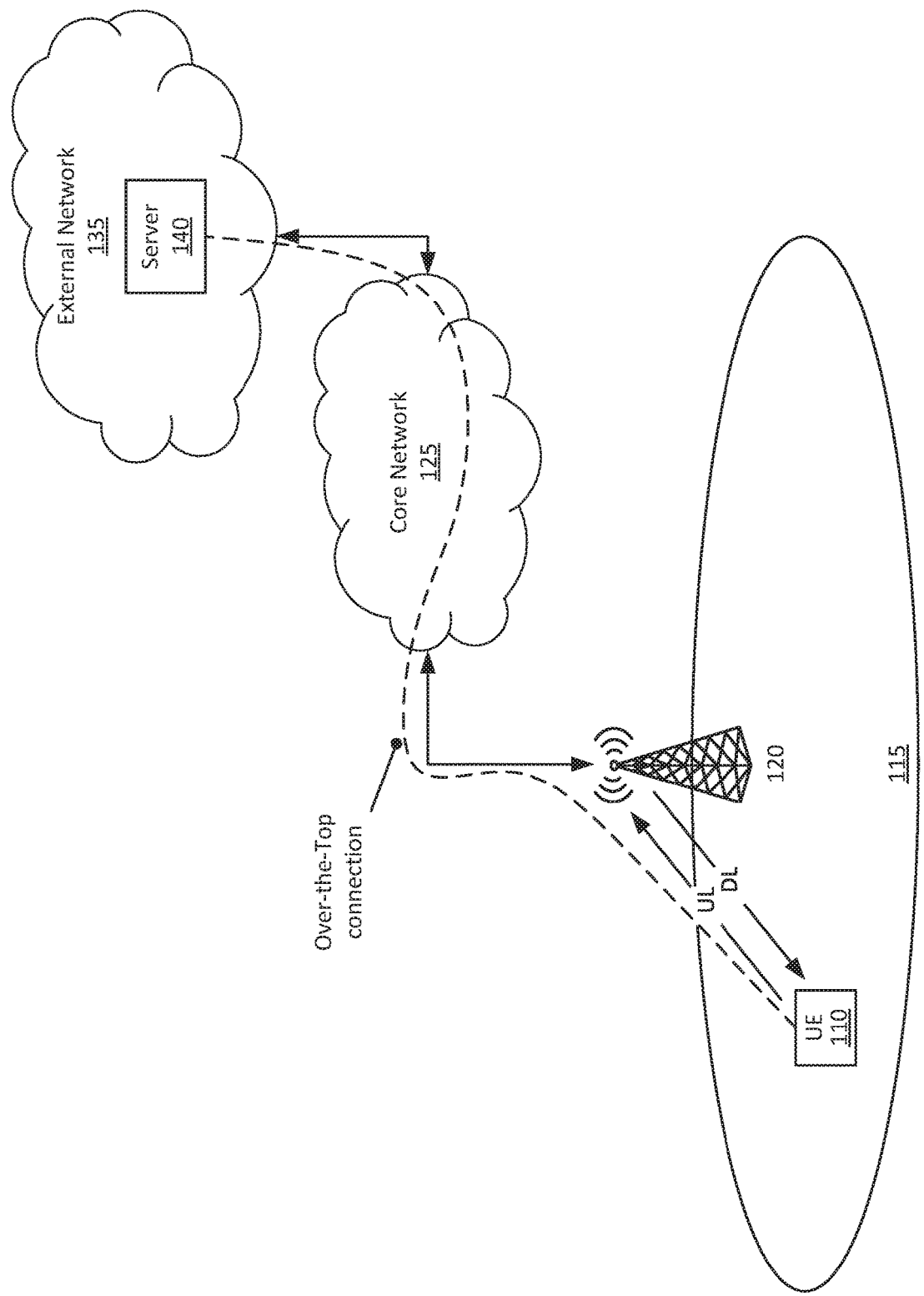
FIG. 3 illustrates an example of signaling in a wireless network.

FIG. 3 illustrates an example of signaling in wireless network 100. As illustrated, the radio interface generally enables the UE 110 and the radio access node 120 to exchange signals and messages in both a downlink direction (from the radio access node 120 to the UE 110) and in an uplink direction (from the UE 110 to the radio access node 120).

The radio interface between the wireless device 110 and the radio access node 120 typically enables the UE 110 to access various applications or services provided by one or more servers 140 (also referred to as application server or host computer) located in an external network(s) 135. The connectivity between the UE 110 and the server 140, enabled at least in part by the radio interface between the UE 110 and the radio access node 120, can be described as an "over-the-top" (OTT) or "application layer" connection. In such cases, the UE 110 and the server 140 are configured to exchange data and/or signaling via the OTT connection, using the radio access network 100, the core network 125, and possibly one or more intermediate networks (e.g. a transport network, not shown). The OTT connection may be transparent in the sense that the participating communication devices or nodes (e.g., the radio access node 120, one or more core network nodes 130, etc.) through which the OTT connection passes may be unaware of the actual OTT connection they enable and support. For example, the radio access node 120 may not or need not be informed about the previous handling (e.g., routing) of an incoming downlink communication with data originating from the server 140 to be forwarded or transmitted to the UE 110. Similarly, the radio access node 120 may not or need not be aware of the subsequent handling of an outgoing uplink communication originating from the UE 110 towards the server 140.

As previously discussed, Autonomous Uplink Transmission (AUL) is being developed to support autonomous retransmission using a configured grant (CG). To support autonomous retransmission in uplink using a configured grant, a new timer can be configured to protect the HARQ procedure so that the retransmission can use the same HARQ process for retransmission as for the initial transmission.

It is assumed that the configured grant timer is not started/restarted when configured grant is not transmitted due to LBT failure. PDU overwrite should be avoided.

The CG timer is not started/restarted when UL LBT fails on PUSCH transmission for grant received by PDCCH addressed to CS-RNTI scheduling retransmission for configured grant.

The CG timer is not started/restarted when the UL LBT fails on PUSCH transmission for UL grant received by PDCCH addressed to C-RNTI, which indicates the same HARQ process configured for configured uplink grant.

Retransmissions of a Transport Block (TB) using configured grant resources, when initial transmission or a retransmission of the TB was previously done using dynamically scheduled resources is conventionally not allowed.

A new retransmission timer can be introduced for automatic retransmission (e.g. timer expiry=HARQ NACK) on a configured grant for the case of the TB previously being transmitted on a configured grant, "CG retransmission timer".

The new retransmission timer can be started when the TB is actually transmitted on the configured grant and stopped upon reception of HARQ feedback (DFI) or dynamic grant for the HARQ process.

The legacy CG timer and behaviour can be maintained for preventing the configured grant overriding the TB scheduled by dynamic grant, i.e. it is (re)started upon reception of the PDCCH as well as transmission on the PUSCH of dynamic grant.

For AUL, the serving gNB can also schedule retransmission for a UE when previous transmission using a configured grant fails.

It is noted that, for configured grant:
When the CG timer expires, the UE should stop the CG retransmission timer (CGRT) if it is still running.
Upon receiving CG activation command, stop the CG retransmission timer for HARQ processes configured for the CG.
No special handling for HARQ process sharing between configured grant and dynamic grants (i.e. follow licensed specifications).
HARQ process ID selection is based on UE implementation. Ongoing retransmissions on HARQ processes should be prioritized.
Multiple active CG configurations can be allowed for NR-U: a single logical channel (LCH) can be mapped to multiple CG configurations; multiple LCHs can be mapped to a single CG configuration.

Based on the above, it is observed that:
The UE can use the CG timer to limit the maximum retransmission attempts for a TB using a configured grant in case the UE supports autonomous HARQ retransmissions for the TB using a configured grant (i.e. CG retransmission timer is configured).
A UE can be configured with multiple active CG configurations.
The mapping relation between LCHs and CG configurations can be one-to-many or many-to-many.

As discussed above, a UE can be configured with multiple active CG configurations and a LCH can be mapped to multiple CG configurations. For each CG configuration, there can be a number of HARQ processes in the HARQ process pool assigned. There can also be a separate CG timer and CG retransmission timer setting associated with each CG configuration. Two potential issues to be addressed in order to support multiple active CG configurations are noted.

Issue 1: Can HARQ processes be shared between two CG configurations?

Issue 2: Can retransmissions of a TB be performed across multiple CG configurations?

For a UE configured with multiple active CG configurations, in order to make the functions of CG based transmissions to work properly, the above issues should be addressed.

Some embodiments described herein are directed towards mechanisms for handling the timers (e.g. CG timer and/or CG retransmission timer) in the case where a UE is configured with multiple active CG configurations, and how to allocate HARQ processes to different CG configurations.

Some embodiments will be described in the context of NR unlicensed spectrum (NR-U) but are not limited to NR-U scenarios. They can also be applicable to other unlicensed operation scenarios such as LTE LAA/eLAA/feLAA/MulteFire. They can also be applicable to licensed spectrum scenarios.

The notation of "ConfiguredGrantTimer" (CGT) will be used herein to represent the timer which is defined for controlling the maximum time period for retransmission attempts of a TB using a configured grant. "CGretransmissionTimer" (CGRT) will be used to represent the timer for triggering a UE's autonomous retransmission of a TB using a configured grant. It will be appreciated that the embodiments are not limited by the timer names which are used for descriptive purposes only.

In a first embodiment, when a UE is configured with multiple active CG configurations, each LCH can be mapped to zero, one, or multiple CG configurations.

At a CG occasion (i.e., with a configured grant) in a CG configuration, if the CG resource is to be used for a new transmission, the UE selects data from one or more LCH from the set of LCHs which are mapped to the CG configuration to build the TB. If the CG configuration is not restricted to certain LCHs, the UE can select data from any LCHs to build the TB. The UE starts the CG timer and CG retransmission timer for the associated HARQ process immediately after the TB is attempted to be transmitted at the PHY layer. The timers are set to the value(s) configured in the CG configuration.

In a second embodiment, after the TB has been transmitted, if the UE does not receive HARQ feedback until the CG retransmission timer is expired, the UE can perform a retransmission for the TB using a configured grant. The UE may take at least one of the below options to select a configured resource for the retransmission.

Option 1: The UE chooses a configured resource in the same CG configuration which is used for the initial transmission (i.e. retransmissions are restricted within the same configuration where the initial transmission is performed).

Option 2a: The UE chooses a configured resource which comes earliest in the time and belongs to a set of CG configurations which the TB is allowed to transmit. In other words, according to the mapping relation between LCHs and CG configurations, the LCHs that have been multiplexed/mapped into the TB can use the configured resource.

Option 2b: The UE chooses a configured resource which comes earliest in time and belongs to any of the multiple CG configurations which have been configured for the UE. According to the mapping relation between LCHs and CG configurations, there may be at least one LCH which has been multiplexed into the TB and is not allowed to use the configured resource. In this case, the mapping relation can be only applicable to the initial transmission.

Option 3: For any of the above options, the UE chooses a configured resource not according to what time the grant becomes available, instead, the UE chooses a configured resource according to other condition, such as:

Select the resource which can achieve highest transmission reliability, or

Select the resource which has shortest PUSCH time duration.

For any above option, the UE can select the resource considering several conditions in parallel.

For any above option, the selected resource shall provide same size TB as the initial TB.

For any above option, the selected resource can provide a different size (smaller or larger) than the initial TB. The UE may need to perform rate matching to fit the new (different) size.

For any above option, using the selected configured resource, the TB may be retransmitted using a same HARQ process. The UE may choose a configured resource in a CG configuration on which the same HARQ process ID is configured.

For any above option, using the selected configured resource, the TB may be retransmitted using a different HARQ process. In case the HARQ process is different for a retransmission, the UE may have two alternatives to handle the retransmission.

Alternative 1: The UE can drop the current TB and trigger an upper layer retransmission.

Alternative 2: The UE can copy the TB from the first HARQ process to the second HARQ process. After that, the UE drops the TB in the first HARQ process.

In a third embodiment, when the TB is attempted to be retransmitted using a selected CG resource in a CG configuration, the UE restarts the CG retransmission timer. The UE can have two options for setting the retransmission timer value.

Option 1: Set to the timer value configured in the selected CG configuration for retransmission.

Option 2: Set to the timer value configured in the CG configuration which was used for the initial transmission of the TB.

In a fourth embodiment, when the TB is attempted to be retransmitted using a selected CG resource in a CG configuration, the UE may have two options to handle the CG timer (may also be regardless of if the LBT operation is successful or failed).

Option 1: The CG timer is kept running without any update or interruption.

Option 2: The CG timer is restarted and set to the timer value, which is configured in the selected CG configuration for retransmission of the TB and subtracted by the elapsed time period since the initial TB transmission.

In a fifth embodiment, for a UE configured with multiple active CG configurations, each CG is configured with a separate set of HARQ processes.

In a sixth embodiment, for a UE configured with multiple active CG configurations, the UE is allowed to share the same HARQ processes between CG configurations, which can give better configuration flexibility.

In a seventh embodiment, for a UE configured with multiple active CG configurations, the set of CG configurations which are mapped to the same set of LCHs, can share the same HARQ processes. In other words, the two CG configurations which are mapped to different set of LCHs, can be configured with different HARQ processes.

Figure 4:
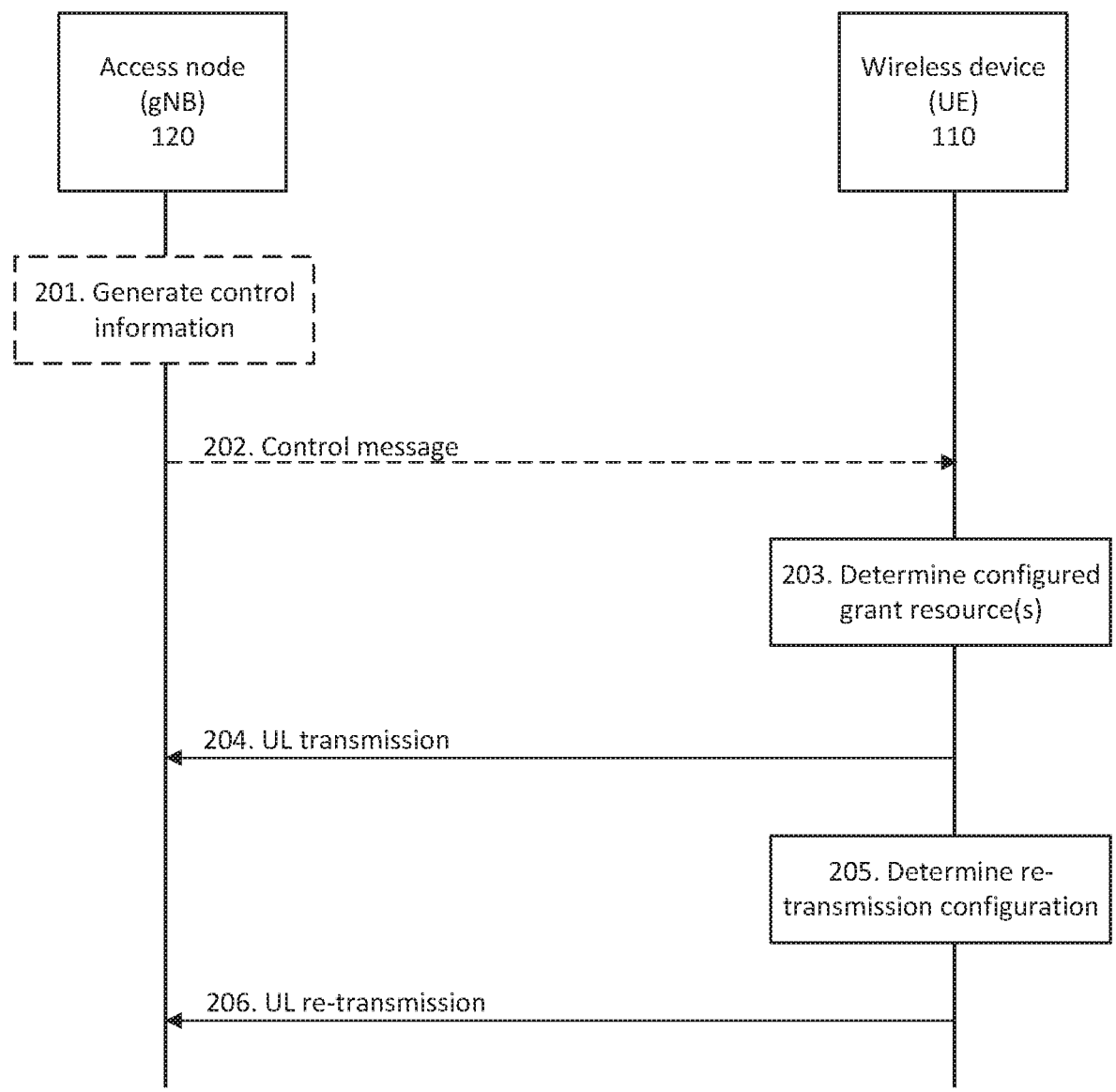
FIG. 4 is an example signaling diagram.

FIG. 4 is an example signaling diagram. An access node, such as gNB 120, can generate parameters for a control/configuration message, such as an RRC and/or a MAC message (step 201). In some embodiments, the control information can include CG configuration information including scheduling/grant parameters. The message can indicate one or more time/frequency resources available for DL or UL transmission. For example, the control message can indicate a number of slots and/or duration for which resources are not available. The resources can correspond to transport blocks, resources blocks (e.g. PRB) and/or a resource block range.

Access node 120 transmits the configured control message to the wireless device 110 (step 202). Wireless device 110 can determine CG resource(s) in accordance with the received control message (step 203).

Wireless device 110 can then attempt to transmit data (step 204) in accordance with the determined CG resource(s). Following transmission, wireless device 110 can determine if a re-transmission is required and determine the associated re-transmission configuration and/or parameters (step 205). The wireless device 110 can then re-transmit the data (step 206) in accordance with the re-transmission configuration.

Figure 5:
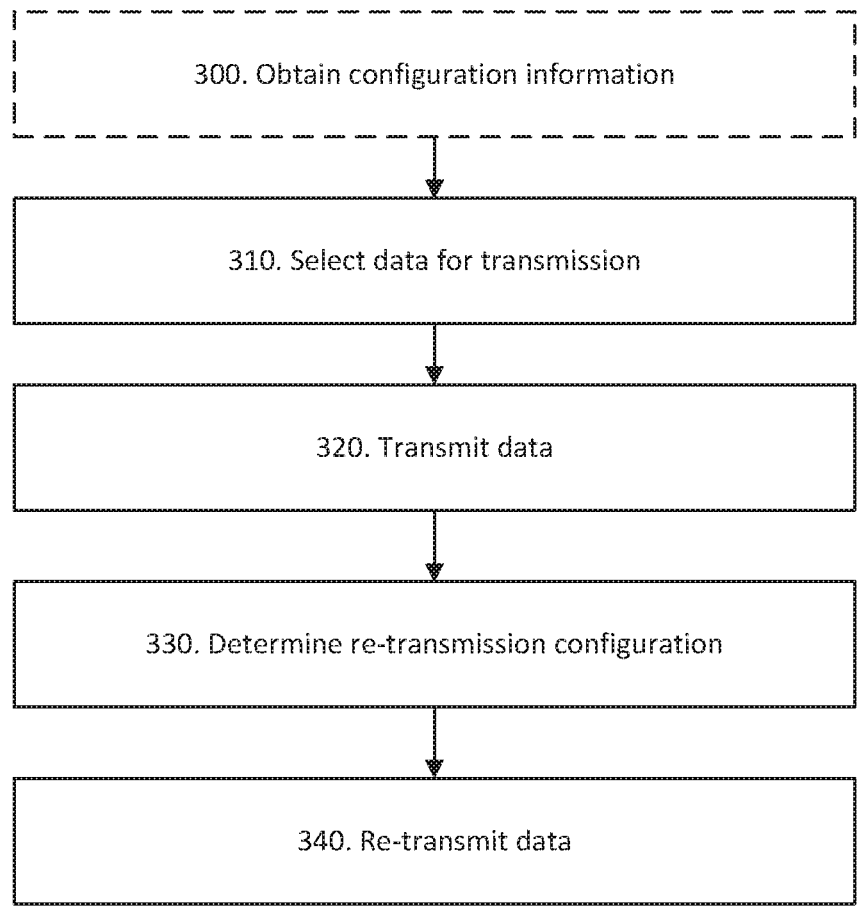
FIG. 5 is a flow chart illustrating a method which can be performed in a wireless device.

FIG. 5 is a flow chart illustrating a method which can be performed in a wireless device, such as UE 110 as described herein. The method can include:

Step 300: Obtaining configuration information. The configuration information can be received via a control message, such RRC and/or MAC signaling. The control message can be received from a network node, such as gNB 120. The configuration information can include an indication of availability of time/frequency resource(s) for UL and/or DL transmission, such as scheduling/grant configuration. The wireless device can be configured with one or more CG configurations in accordance with the obtained configuration information.

Step 310: Selecting data for transmission in accordance with the configuration information. When a CG resource is to be used for a new transmission, the wireless device selects data for transmission (e.g. to generate a TB). The data can be selected from a LCH associated with one (or more) of the CG configuration(s). The LCH can be mapped to one of more of the CG configurations.

Step 320: Transmitting the data. The wireless device can attempt to transmit the selected data on the resource of the corresponding CG configuration.

Step 330: Determining if retransmission is required.

In some embodiments, upon initial transmission, the wireless device can start one or more timers, such as the CG timer and/or the CG retransmission timer as have been described herein. The timers can be set to a value(s) according to the CG configuration used for the initial transmission.

In some embodiments, determining that the retransmission is required can be in response to an expiration of the retransmission timer. The retransmission timer can be stopped in response to one or more of: receiving HARQ feedback indicating an acknowledgement (ACK) or negative acknowledgment (NACK); receiving a grant indicating a new transmission or retransmission for the initially transmitted data; or expiration of the timer itself.

In some embodiments, if the wireless device does not receive HARQ feedback before expiration of a timer, it is determined that retransmission is required.

The wireless device can further determine the parameters/configuration to use for the re-transmission. This can include selecting a CG resource to use for re-transmission. In some embodiments, the wireless device can select a resource in the same CG configuration as the initial transmission. In some embodiments, the wireless device can select a resource in a different CG configuration as the initial transmission. In some embodiments, the wireless device can select a resource belonging to any CG configuration associated with the LCH and/or the wireless device. In some embodiments, the wireless device can select an earliest time resource belonging to a CG configuration. The resource can be selected further based on other conditions as described herein.

In some embodiments, the wireless device can determine a HARQ process for the re-transmission. The HARQ process can be the same HARQ process as the initial transmission or a second, different HARQ process. In some embodiments, the wireless device can be configured with a separate HARQ process for each CG configuration. In some embodiments, the wireless device can share HARQ processes between CG configurations. In some embodiments, the wireless device can share HARQ processes between CG configurations associated with the same LCH(s).

Step 340: Re-transmitting the data. The wireless device can attempt to re-transmit the data in accordance with the determined retransmission CG configuration.

In some embodiments, upon re-transmission, the wireless device can determine to start (or restart) one or more timers, such as the CG timer and/or the retransmission timer. In some embodiments, the timer value(s) can be set in accordance with the CG configuration(s) used for transmission and/or retransmission. In some embodiments, the timer value(s) can be set in accordance with a time period between the initial transmission and the re-transmission. In some embodiments, the CG timer is not updated following retransmission while the retransmission timer can be restarted in accordance with the CG configuration used for the retransmission.

It will be appreciated that one or more of the above steps can be performed simultaneously and/or in a different order. Also, steps illustrated in dashed lines are optional and can be omitted in some embodiments.

Figure 6:
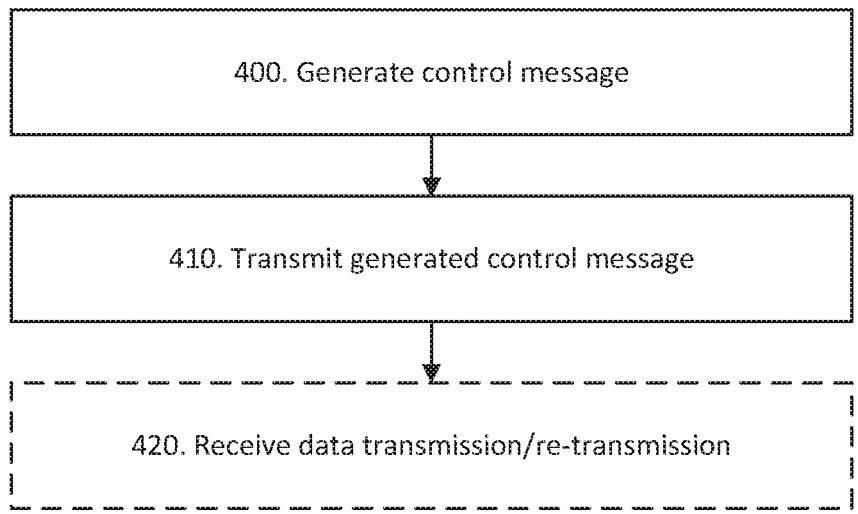
FIG. 6 is a flow chart illustrating a method which can be performed in a network node.

FIG. 6 is a flow chart illustrating a method which can be performed in a network node, such as gNB 120 as described herein. The method can include:

Step 400: Generate a control message. This can include one or more of generating/configuring/modifying/adding parameters or other information in a control message, such as a RRC and/or MAC message. The control message can include one or more CG configurations for a wireless device, such as UE 110.

Step 410: Transmit the generated control message. The control message can be transmitted to one or more wireless devices.

Step 420: The network node optionally receives a data transmission and/or re-transmission in accordance with the configuration information. In some embodiments, the network node can receive a data retransmission from a wireless device, wherein a first CG configuration was used for an initial data transmission and a second CG configuration was used for the retransmission.

It will be appreciated that one or more of the above steps can be performed simultaneously and/or in a different order. Also, steps illustrated in dashed lines are optional and can be omitted in some embodiments.

Some embodiments described herein can allow for improved configuration flexibility for handling configured resource. Some embodiments provide for improved utilization of configured resources, including considering QoS requirements of different services that may share the same configured resource(s).

Figure 7:
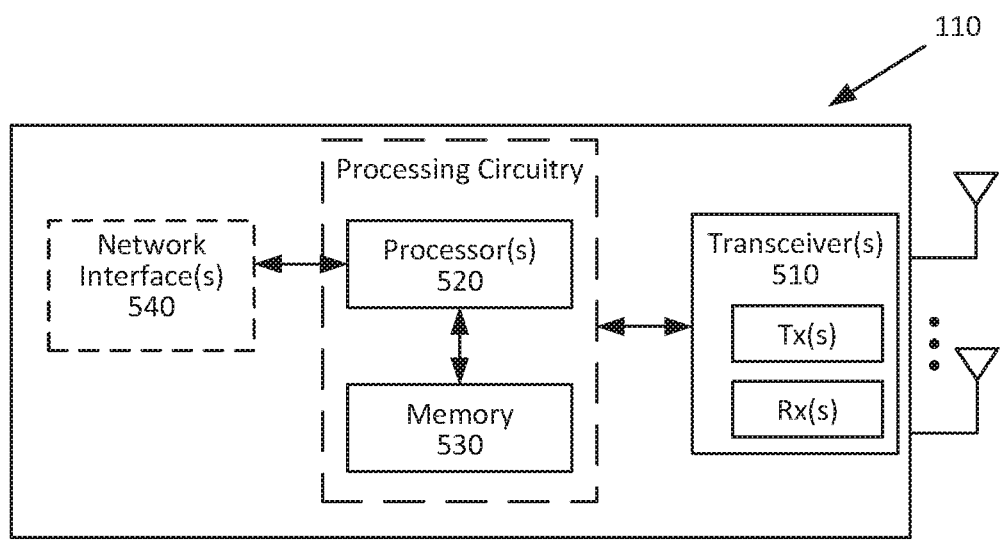
FIG. 7 is a block diagram of an example wireless device.

FIG. 7 is a block diagram of an example wireless device, UE 110, in accordance with certain embodiments. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 7 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
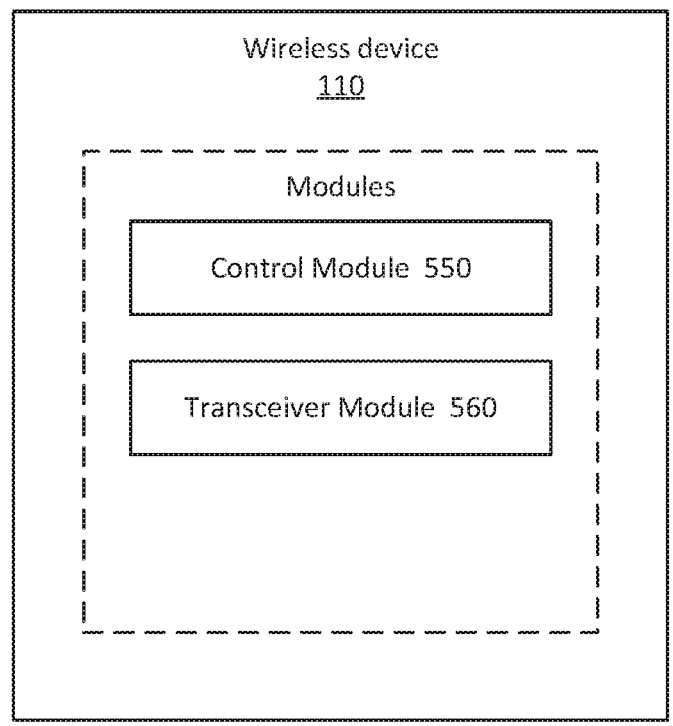
FIG. 8 is a block diagram of an example wireless device with modules.

In some embodiments, the wireless device UE 110 may comprise a series of modules configured to implement the functionalities of the wireless device described above. Referring to FIG. 8, in some embodiments, the wireless device 110 may comprise a control module 550 for receiving and interpreting control/configuration information and a transceiver module 560 for transmitting and re-transmitting data transmissions in accordance with the configuration information.

It will be appreciated that the various modules may be implemented as combination of hardware and software, for instance, the processor, memory and transceiver(s) of UE 110 shown in FIG. 7. Some embodiments may also include additional modules to support additional and/or optional functionalities.

Figure 9:
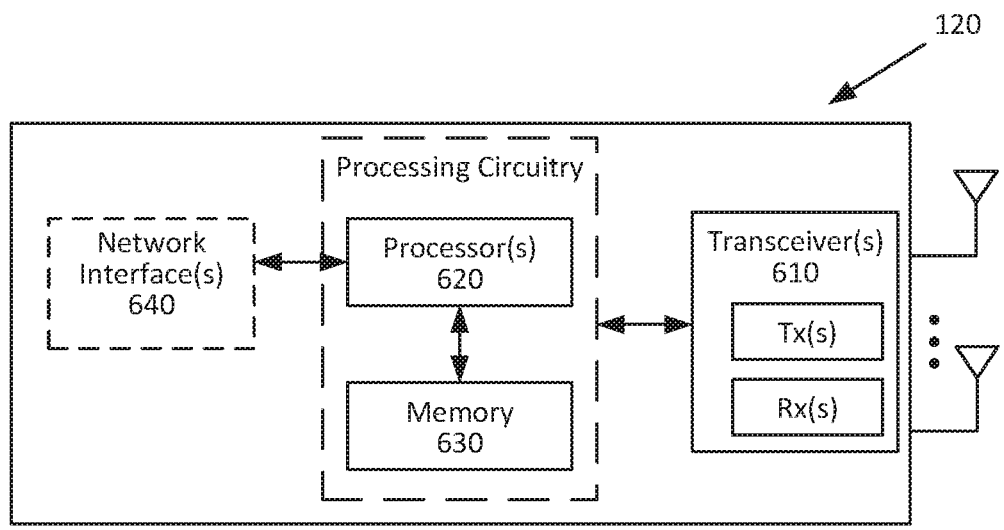
FIG. 9 is a block diagram of an example network node.

FIG. 9 is a block diagram of an exemplary network node, such as radio access node 120, in accordance with certain embodiments. Network node 120 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by a radio access node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of radio access node 120, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 120, send output from node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 120 can include additional components beyond those shown in FIG. 9 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 9 may be included in other network nodes (such as UE 110, core network node 130, etc.). Other network nodes may optionally include or not include a wireless interface (such as the transceiver described in FIG. 9).

Figure 10:
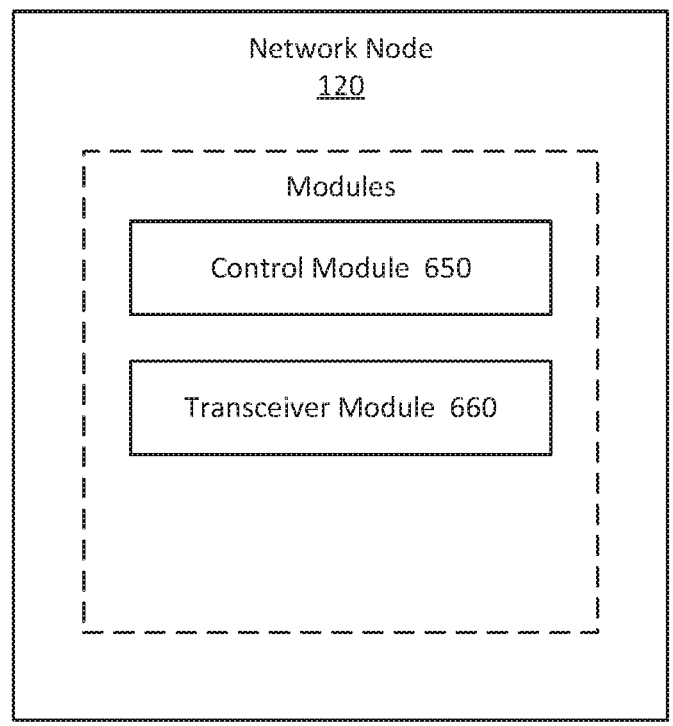
FIG. 10 is a block diagram of an example network node with modules.

In some embodiments, the network node 120, may comprise a series of modules configured to implement the functionalities of the network node described above. Referring to FIG. 10, in some embodiments, the network node 120 can comprise a control module 650 for generating and transmitting control/configuration information and a transceiver module 660 for receiving data transmissions/re-transmissions in accordance with the configuration information.

It will be appreciated that the various modules may be implemented as combination of hardware and software, for instance, the processor, memory and transceiver(s) of network node 120 shown in FIG. 9. Some embodiments may also include additional modules to support additional and/or optional functionalities.

Figure 11:
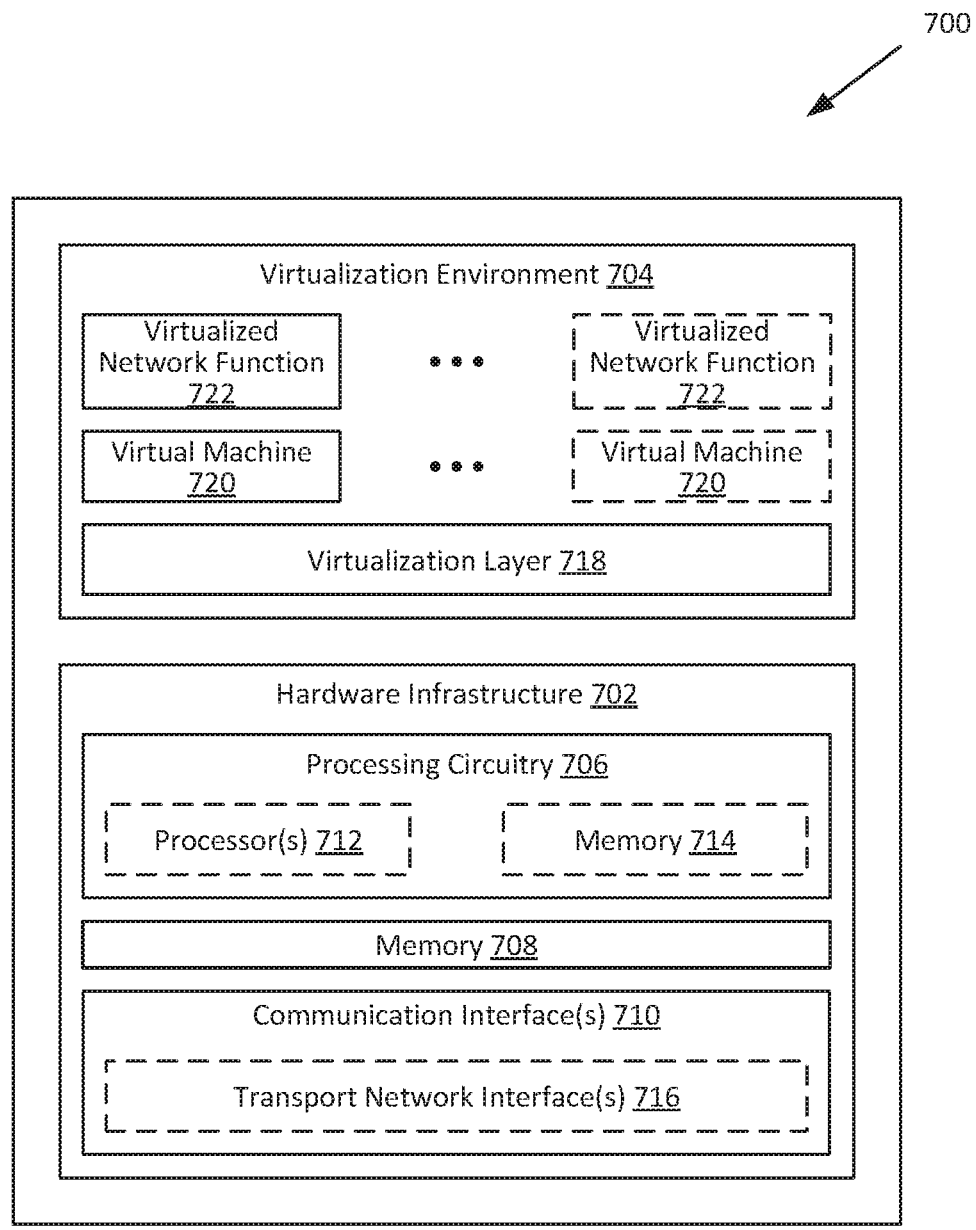
FIG. 11 is a block diagram of an example virtualized processing node.

Turning now to FIG. 11, some network nodes (e.g. UEs 110, radio access nodes 120, core network nodes 130, etc.) in the wireless communication network 100 may be partially or even entirely virtualized. As a virtualized entity, some or all the functions of a given network node are implemented as one or more virtual network functions (VNFs) running in virtual machines (VMs) hosted on a typically generic processing node 700 (or server).

Processing node 700 generally comprises a hardware infrastructure 702 supporting a virtualization environment 704.

The hardware infrastructure 702 generally comprises processing circuitry 706, a memory 708, and communication interface(s) 710.

Processing circuitry 706 typically provides overall control of the hardware infrastructure 702 of the virtualized processing node 700. Hence, processing circuitry 706 is generally responsible for the various functions of the hardware infrastructure 702 either directly or indirectly via one or more other components of the processing node 700 (e.g. sending or receiving messages via the communication interface 710). The processing circuitry 706 is also responsible for enabling, supporting and managing the virtualization environment 704 in which the various VNFs are run. The processing circuitry 706 may include any suitable combination of hardware to enable the hardware infrastructure 702 of the virtualized processing node 700 to perform its functions.

In some embodiments, the processing circuitry 706 may comprise at least one processor 712 and at least one memory 714. Examples of processor 712 include, but are not limited to, a central processing unit (CPU), a graphical processing unit (GPU), and other forms of processing unit. Examples of memory 714 include, but are not limited to, Random Access Memory (RAM) and Read Only Memory (ROM). When processing circuitry 706 comprises memory 714, memory 714 is generally configured to store instructions or codes executable by processor 712, and possibly operational data. Processor 712 is then configured to execute the stored instructions and possibly create, transform, or otherwise manipulate data to enable the hardware infrastructure 702 of the virtualized processing node 700 to perform its functions.

Additionally, or alternatively, in some embodiments, the processing circuitry 706 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 706 comprises application-specific and/or programmable circuitry (e.g., ASICs, FPGAs), the hardware infrastructure 702 of the virtualized processing node 700 may perform its functions without the need for instructions or codes as the necessary instructions may already be hardwired or preprogrammed into processing circuitry 706. Understandably, processing circuitry 706 may comprise a combination of processor(s) 712, memory(ies) 714, and other application-specific and/or programmable circuitry.

The communication interface(s) 710 enable the virtualized processing node 700 to send messages to and receive messages from other network nodes (e.g., radio network nodes, other core network nodes, servers, etc.). In that sense, the communication interface 710 generally comprises the necessary hardware and software to process messages received from the processing circuitry 706 to be sent by the virtualized processing node 700 into a format appropriate for the underlying transport network and, conversely, to process messages received from other network nodes over the underlying transport network into a format appropriate for the processing circuitry 706. Hence, communication interface 710 may comprise appropriate hardware, such as transport network interface(s) 716 (e.g., port, modem, network interface card, etc.), and software, including protocol conversion and data processing capabilities, to communicate with other network nodes.

The virtualization environment 704 is enabled by instructions or codes stored on memory 708 and/or memory 714. The virtualization environment 704 generally comprises a virtualization layer 718 (also referred to as a hypervisor), at least one virtual machine 720, and at least one VNF 722. The functions of the processing node 700 may be implemented by one or more VNFs 722.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

GLOSSARY

The present description may comprise one or more of the following abbreviations:
3GPP Third Generation Partnership Project
ACK Acknowledgement
AP Access point
ARQ Automatic Repeat Request
BS Base Station
BSC Base station controller
BSR Buffer Status Report
BTS Base transceiver station
CA Carrier Aggregation
CC Component carrier
CCCH SDU Common Control Channel SDU
CG Configured Grant
CGI Cell Global Identifier
CN Core network
CQI Channel Quality information
CSI Channel State Information
CU Central Unit
DAS Distributed antenna system
DC Dual connectivity
DCCH Dedicated Control Channel
DCI Downlink Control Information
DL Downlink
DMRS Demodulation Reference Signal
DU Distributed Unit
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IAB Integrated Access Backhaul
IoT Internet of Things
LCH Logical channel
LTE Long-Term Evolution
M2M Machine to Machine
MAC Medium Access Control
MBMS Multimedia Broadcast Multicast Services
MCG Master cell group
MDT Minimization of Drive Tests
MeNB Master eNode B
MME Mobility Management Entity
MSC Mobile Switching Center
MSR Multi-standard Radio
MTC Machine Type Communication
NACK Negative acknowledgement
NDI Next Data Indicator
NR New Radio
O&M Operation and Maintenance OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDCP Packet Data Convergence Protocol
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell
PUCCH Physical Uplink Control Channel
PUSCH Physical Uplink Shared Channel
RAT Radio Access Technology
RB Resource Block
RF Radio Frequency
RLC Radio Link Control
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TB Transport Block
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by a wireless device, comprising:
obtaining configuration information including a plurality of configured granted (CG) configurations;
selecting data from a logical channel mapped to a first CG configuration for transmission;
transmitting the selected data using the first CG configuration and, in response to transmitting the selected data, starting a retransmission timer in accordance with the first CG configuration;
determining that a retransmission is required;
selecting a second CG configuration to use for the retransmission, the second CG configuration being different than the first CG configuration;
retransmitting the data using the selected second CG configuration; and
in response to retransmitting the data, restarting the retransmission timer in accordance with the second CG configuration.

2. The method of claim 1, wherein the configuration information is obtained from a network node.

3. The method of claim 1, wherein the logical channel is mapped to one or more of the plurality of CG configurations.

4. The method of claim 1, wherein one or more of the plurality of CG configurations share a same Hybrid Automatic Repeat Request (HARQ) process.

5. The method of claim 1, further comprising, in response to transmitting the selected data, starting a CG timer in accordance with the first CG configuration, the CG timer defining a maximum time period during which the wireless device can trigger autonomous retransmission.

6. The method of claim 1, wherein the retransmission timer defines a time period after which the wireless device triggers a next retransmission attempt.

7. The method of claim 1, further comprising, stopping the retransmission timer in response to one of:
receiving HARQ feedback indicating an acknowledgement (ACK) or negative acknowledgment (NACK); or
receiving a grant indicating a new transmission or retransmission for the transmitted data.

8. The method of claim 1, wherein determining that the retransmission is required is in response to an expiration of the retransmission timer.

9. The method of claim 1, wherein the second CG configuration is selected in accordance with selecting an earliest time resource belonging to any of the plurality of CG configurations.

10. The method of claim 1, wherein the second CG configuration is selected in accordance with the first and second CG configurations sharing a same HARQ process.

11. The method of claim 1, wherein the second CG configuration is selected in accordance with the second CG configuration providing a same transport block size as the transmitted data.

12. The method of claim 1, wherein the logical channel is not mapped to the second CG configuration.

13. The method of claim 1, wherein, in response to retransmitting the data, a CG timer is not updated.

14. A wireless device comprising a radio interface and processing circuitry configured to:
obtain configuration information including a plurality of configured granted (CG) configurations;
select data from a logical channel mapped to a first CG configuration for transmission;
transmit the selected data using the first CG configuration and, in response to transmitting the selected data, start a retransmission timer in accordance with the first CG configuration;

determine that a retransmission is required;

select a second CG configuration to use for the retransmission, the second CG configuration being different than the first CG configuration;

retransmit the data using the selected second CG configuration; and in response to retransmitting the data, restart the retransmission timer in accordance with the second CG configuration.

15. The wireless device of claim 14, wherein the configuration information is obtained from a network node.

16. The wireless device of claim 14, wherein the logical channel is mapped to one or more of the plurality of CG configurations.

17. The wireless device of claim 14, wherein one or more of the plurality of CG configurations share a same Hybrid Automatic Repeat Request (HARQ) process.

18. The wireless device of claim 14, further configured to, in response to transmitting the selected data, start a CG timer in accordance with the first CG configuration, the CG timer defining a maximum time period during which the wireless device can trigger autonomous retransmission.

19. The wireless device of claim 14, wherein the retransmission timer defines a time period after which the wireless device triggers a next retransmission attempt.

20. The wireless device of claim 14, further configured to stop the retransmission timer in response to one of:

receiving HARQ feedback indicating an acknowledgement (ACK) or negative acknowledgment (NACK); or receiving a grant indicating a new transmission or retransmission for the transmitted data.

21. The wireless device of claim 14, wherein the determination that the retransmission is required is in response to an expiration of the retransmission timer.

22. The wireless device of claim 14, wherein the second CG configuration is selected in accordance with selecting an earliest time resource belonging to any of the plurality of CG configurations.

23. The wireless device of claim 14, wherein the second CG configuration is selected in accordance with the first and second CG configurations sharing a same HARQ process.

24. The wireless device of claim 14, wherein the second CG configuration is selected in accordance with the second CG configuration providing a same transport block size as the transmitted data.

25. The wireless device of claim 14, wherein the logical channel is not mapped to the second CG configuration.

26. The wireless device of claim 14, wherein, in response to retransmitting the data, a CG timer is not updated.

* * * * *